United States Patent
Leyda et al.

(10) Patent No.: US 6,336,176 B1
(45) Date of Patent: Jan. 1, 2002

(54) MEMORY CONFIGURATION DATA PROTECTION

(75) Inventors: Jeffery Leyda, Minneapolis; Robert R. Hoffman, Jr., Mounds View, both of MN (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/289,153

(22) Filed: Apr. 8, 1999

(51) Int. Cl.[7] ............................................... G06F 12/06
(52) U.S. Cl. ..................... 711/170; 711/101; 711/102; 711/103; 711/104; 711/105; 711/172; 711/171; 711/173; 714/36; 714/40; 714/41; 714/42
(58) Field of Search ............................... 714/36, 40–42, 714/718–724; 711/1, 5, 101–105, 170–173

(56) References Cited

U.S. PATENT DOCUMENTS

| | | | | | |
|---|---|---|---|---|---|
| 5,790,849 A | * | 8/1998 | Crocker | ......................... | 713/2 |
| 5,809,330 A | * | 9/1998 | Ninomiya | ....................... | 710/9 |
| 5,850,562 A | * | 12/1998 | Crump | ............................ | 713/1 |
| 5,915,265 A | * | 6/1999 | Crocker et al. | .............. | 711/170 |

* cited by examiner

Primary Examiner—Than Nguyen
(74) Attorney, Agent, or Firm—Trop, Pruner & Hu, P.C.

(57) ABSTRACT

A method to protect against system memory configuration data loss and/or corruption includes obtaining configuration data from a computer system memory module, determining if the obtained configuration data is incorrect, and repairing the configuration data of the memory module if the obtained configuration data is incorrect. A computer system providing memory configuration data protection includes a random access memory having one or more modules (each memory module having module configuration data), a nonvolatile storage element having configuration data for each of the memory modules stored thereon, and a processor module adapted to determine if the configuration data from one of the memory modules is incorrect and, if it is, use at least a portion of the configuration data stored in the nonvolatile storage element to replace at least a portion of the configuration data of the memory module having the incorrect configuration data.

50 Claims, 2 Drawing Sheets

MEMORY CONFIGURATION DATA PROTECTION

BACKGROUND

The invention relates generally to computer system memory and, more particularly, to the protection of computer system memory configuration data.

During power-on self test (POST) and reset operations, computer systems generally determine the size and configuration of their main memory. Typically, basic input-output system (BIOS) routines determine the size and operating characteristics of main memory and, using this information, configure system hardware (e.g., memory control interface) so that the memory may be accessed during the normal course of operation (e.g., following completion of POST processing and invocation of an operating system).

In some computer systems, main memory may include nonvolatile storage elements that store memory configuration data. This data may be interrogated by BIOS routines during start-up or POST processing and used to configure memory interface hardware. Computer systems that include synchronous dynamic random access memory (SDRAM) dual in-line memory modules (DIMMs) designed to operate in conformance with the serial presence detect (SPD) specification, for example, include a 2048 bit EEPROM component. This nonvolatile storage contains data programmed by the DIMM manufacturer that identifies the module type and various SDRAM organization and timing parameters.

In some cases, SPD DIMMs do not provide a mechanism (e.g., a write-protect pin) to protect the SPD EEPROM against inadvertent write operations. In other cases, SPD DIMMs provide a protection mechanism that may not be properly used. If memory configuration data (e.g., SPD EEPROM) is altered, it may not be possible to properly configure memory control hardware. Thus, it would be beneficial to provide a technique to protect memory configuration data.

SUMMARY

In one embodiment the invention provides a method to protect against system memory configuration data loss and/or corruption. The method includes obtaining configuration data from a computer system memory module, determining if the obtained configuration data is incorrect, and repairing the configuration data of the memory module if the obtained configuration data is incorrect. The method may be stored in any media that is readable and executable by a computer system.

In another embodiment, the invention provides a computer system that includes a random access memory having one or more modules (each memory module having module configuration data), a nonvolatile storage element having stored therein configuration data for each of the one or more memory modules, and a processor module operatively coupled to the random access memory and nonvolatile storage element, where the computer processor is adapted to determine if the configuration data from one of the memory modules is incorrect and, if it is, use at least a portion of the configuration data from the nonvolatile storage element to replace at least a portion of the configuration data of the memory module having the incorrect configuration data.

DETAILED DESCRIPTION

Techniques to protect against system memory configuration data loss and/or corruption are described. The following embodiments of the invention are illustrative only and are not to be considered limiting in any respect.

Figure 1:
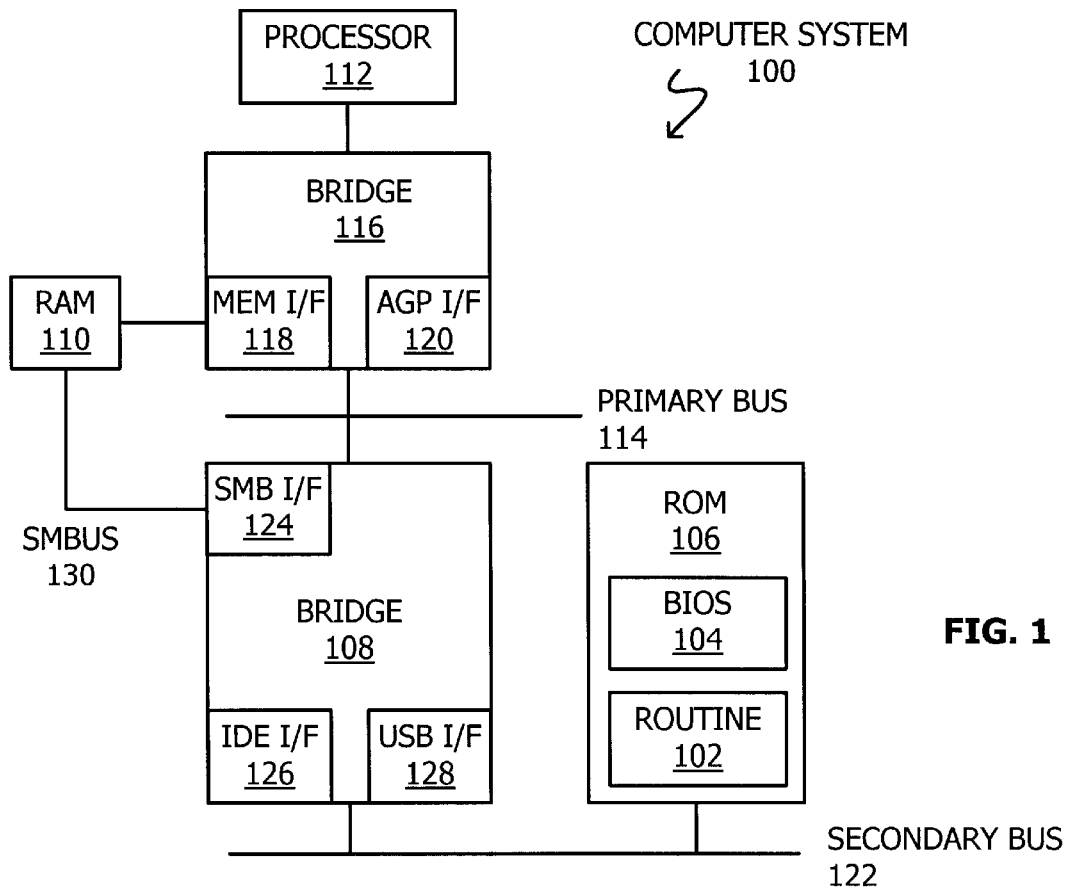
FIG. 1 shows a computer system providing memory configuration data protection in accordance with one embodiment of the invention.

Referring to FIG. 1, an illustrative computer system 100 having routine 102 to provide memory configuration data protection is shown. During power-on self-test (POST) operations, basic input-output system (BIOS) routines 104 executing out of read only memory (ROM) 106 cause bridge circuit 108 to communicate with system random access memory (RAM) 110 to obtain memory configuration data. In the event the obtained configuration data is incorrect, routine 102 may restore a previously determined configuration so that computer system 100 may properly boot.

As shown in FIG. 1, computer system 100 may also include host processor 112 coupled to primary bus 114 through bridge circuit 116. Bridge circuit 116, in turn, may provide memory access control through memory interface 118 and control of accelerated graphics port (AGP) devices through AGP interface 120. Illustrative host processors include the PENTIUM® family of processors from Intel Corporation. Illustrative primary buses include those that operate in conformance with the Peripheral Component Interface (PCI) specification. An illustrative primary bus bridge circuit 116 is the 82443LX PCI-to-AGP controller manufactured by Intel Corporation. Illustrative system memory includes serial presence detect (SPD) memory. (See the "PC SDRAM Serial Presence Detect (SPD) Specification," Revision 1.2A, 1997.)

Bridge circuit 108 couples primary bus 114 to secondary bus 122, while also providing system management bus (SMB) interface 124 and, perhaps, integrated device electronics (IDE) 126 and universal serial bus (USB) 128 interfaces. System management bus (SMBus) 130 couples bridge circuit 108 to system memory 110. (See the "System Management Bus Specification," revision 1.0, 1995, from Intel Corporation or the ) An illustrative secondary bus bridge circuit 108 is the 82371AB PCI-to-ISA/IDE controller made by Intel Corporation.

Figure 2:
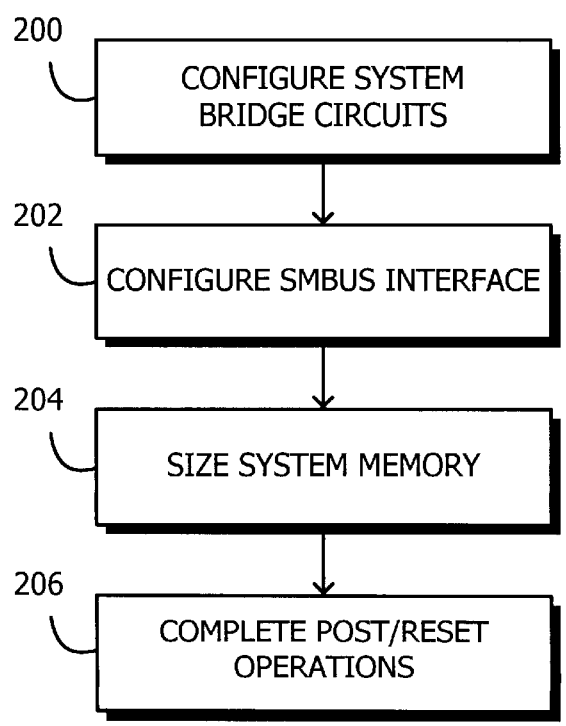
FIG. 2 shows a flowchart for a power-on self-test operation in accordance with one embodiment of the invention.

Referring to FIG. 2, a POST operation in accordance with one embodiment of the invention is shown. Initially bridge circuits 108 and 116 are configured to allow communication between ROM 106 and processor 112 (block 200). Next, BIOS routines 104 configure SMBus interface 124 to allow communication with system memory 110 (block 202). Routine 102 may interrogate system memory 110 (via SMB interface 124 and SMBus 130) to obtain memory size and other configuration data. Memory configuration and size information may then be passed to bridge circuit 116 where it is used to configure memory interface 118 (block 204). Following memory sizing/configuration, the remainder of conventional POST or reset processing may continue (block 206).

Figure 3:
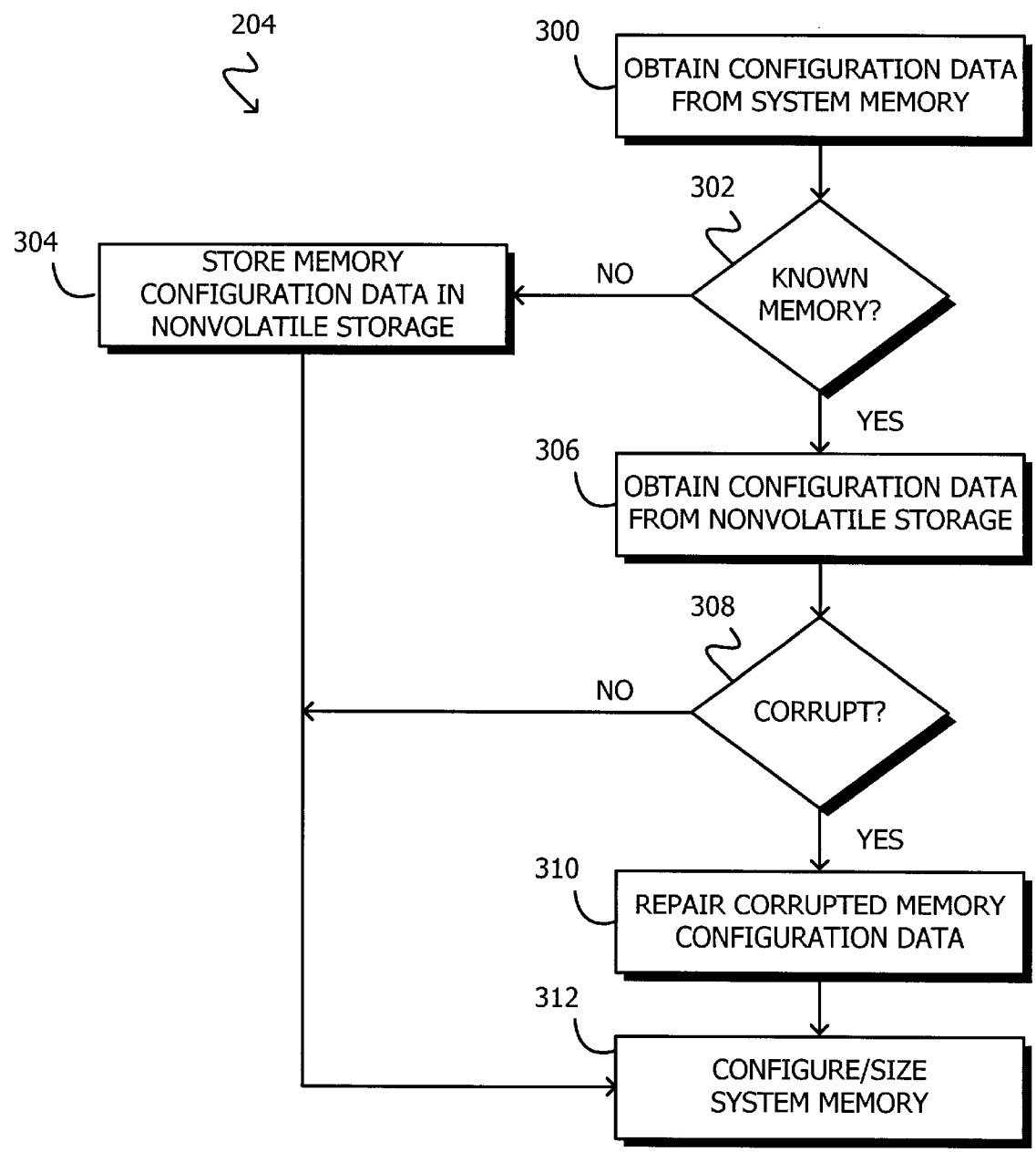
FIG. 3 shows a flowchart of the memory configuration/sizing acts of FIG. 2.

Referring now to FIG. 3, a flowchart outlining the memory sizing acts of block 204 is shown. It will be recognized that the acts of FIG. 3 are generally performed for each memory module present in a computer system. Thus, if system memory 110 includes four memory modules, the acts of FIG. 3 are performed four times, one for each memory module.

Memory sizing/configuration operation 204 may begin with routine 102 art obtaining configuration data from nonvolatile memory element of system memory 110 (block 300). In general, configuration data may be obtained from system memory 110 using any desired technique. For example, if system memory 110 is SPD memory, configuration data may be obtained via SMBus 130 in accordance with the SPD specification. Illustrative memory configuration data include, but is not limited to: the total number of bytes within the memory device; memory type (e.g., fast page mode; extended data output, and SDRAM); number of row and column addresses available in the memory module; memory module data width; memory cycle time; memory refresh rate; memory write latency; and configuration data checksum.

If the current memory module is a new memory module (the "no" prong of diamond 302), the obtained configuration data may be stored in a nonvolatile memory for later use (block 304) and then used to configure memory interface 118 (block 312). A new memory module may be detected, for instance, if system memory 110 did not previously contain a memory module at the location (e.g., memory slot) of the current memory module. Obtained memory configuration data may be stored in any available nonvolatile storage accessible to routine 102 (that is, processor 112 executing routine 102). In general, memory configuration data may be stored in any nonvolatile memory including, but not limited to, semiconductor memory devices such as flash memory devices, EPROM, EEPROM such as ROM 106. In addition, some host processors (e.g., 112) include some nonvolatile storage for use by routines such as routine 102.

If the current memory module is a known memory module (the "yes" prong of diamond 302), previously stored memory configuration data is retrieved from nonvolatile storage (block 306). Next, a test is made to determine if the configuration data obtained during the acts of block 300 has been corrupted (diamond 308). In one embodiment, some or all of the previously stored configuration data (obtained via the acts of block 306) may be compared to the data obtained directly from the memory (during the acts of block 306). In another embodiment, a checksum value obtained from memory 110 is compared to a checksum value generated in response to the obtained memory configuration data. If there is no mismatch, i.e., no corruption (the "no" prong of diamond 308), the configuration data (obtained from either the memory module or from nonvolatile storage) may be used to configure memory interface 118 (block 312).

If the configuration data obtained from system memory differs from that obtained from nonvolatile storage (the "yes" prong of diamond 308), it may be assumed that the memory's configuration data has been corrupted and corrective action is required (block 310). In one embodiment, memory configuration data previously stored in nonvolatile storage may be used to rewrite the memory configuration data of memory 110. In another embodiment, memory 110 may be checked by routine 102 to determine its size and other essential operating parameters. This information may then be stored in nonvolatile memory and used to configure system memory (block 312).

Various changes in the materials, components, circuit elements, as well as in the details of the illustrated operational methods are possible without departing from the scope of the claims. For instance, configuration data stored in nonvolatile memory may be compressed to reduce the amount of storage required. In addition, configuration data stored in nonvolatile memory may be associated with an error detection and/or correction code to guard against inadvertent errors introduced by the nonvolatile memory. Additionally, routine 102 may be an integral part of BIOS 104. Further, acts in accordance with FIG. 3 may be performed in alternate sequence. For example, routine 102 may obtain configuration data from nonvolatile memory (block 306) before obtaining configuration data from system memory (block 300).

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A method comprising:
   obtaining data from a computer system memory module, the data indicating configuration information specific to the memory module;
   determining if the obtained data is incorrect; and
   repairing the data of the memory module if the obtained data is incorrect.

2. The method of claim 1, further comprising configuring a memory control interface in accordance with the repaired data.

3. The method of claim 2, wherein the act of configuring a memory control interface comprises configuring a memory control interface in a computer system bridge circuit.

4. The method of claim 2, wherein the acts of obtaining, determining, repairing, and configuring are performed for each memory module in a computer system memory.

5. The method of claim 1, wherein the act of obtaining data comprises obtaining the data from a serial presence detect random access memory module.

6. The method of claim 1, wherein the act of determining if the obtained data is incorrect comprises evaluating a checksum value obtained as part of the obtained data.

7. The method of claim 1, wherein the act of determining if the obtained data is incorrect further comprises:
   determining if the data obtained from the memory module represents a new memory module; and if it does
   storing the data obtained from the memory module in a nonvolatile storage element.

8. The method of claim 1, wherein the act of obtaining data further comprises obtaining second data for the memory module from a nonvolatile storage element.

9. The method of claim 8, wherein the act of obtaining the second data comprises obtaining data from a basic input-output system memory.

10. The method of claim 8, wherein the act of determining if the obtained data is incorrect comprises comparing a portion of the data with a portion of the second data.

11. The method of claim 8, wherein the act of repairing comprises replacing that portion of the data obtained from the memory module with a corresponding portion of the second data obtained from the nonvolatile storage.

12. The method of claim 8, wherein the act of repairing comprises replacing all of the data obtained from the memory module with the second data obtained from the nonvolatile storage.

13. A program storage device, readable by a computer processor, comprising:
   instructions stored on the program storage device for causing the computer processor to obtain data from a computer system memory module, the data indicating configuration information specific to the memory module;

determine if the obtained data is incorrect; and repair the data of the memory module if the obtained data is incorrect.

14. The program storage device of claim 13, further comprising instructions to configure a memory control interface in accordance with the repaired memory data.

15. The program storage device of claim 14, wherein the instructions to configure a memory control interface comprise instructions to configure a memory control interface in a computer system bridge circuit.

16. The program storage device of claim 13, wherein the instructions to obtain data comprise instructions to obtain the data from a serial presence detect random access memory module.

17. The program storage device of claim 13, wherein the instructions to determine if the obtained data is incorrect comprise instructions to evaluate a checksum value obtained as part of the obtained data.

18. The program storage device of claim 13, wherein the instructions to determine if the obtained data is incorrect further comprise instructions to:

determine if the data obtained from the memory module represents a new memory module; and if it does store the data obtained from the memory module in a nonvolatile storage element.

19. The program storage device of claim 13, wherein the instructions to obtain data further comprise instructions to obtain second data for the memory module from a nonvolatile storage element.

20. The program storage device of claim 19, wherein the nonvolatile storage element comprises an electrically erasable programmable read only memory element.

21. The program storage device of claim 20, wherein the electrically erasable programmable read only memory element is one element of a computer processor module.

22. The program storage device of claim 19, wherein the nonvolatile storage element comprises a FLASH memory device.

23. The program storage device of claim 19, wherein the instructions to determine if the obtained data is incorrect comprise instructions to compare a portion of the data with a portion of the second data.

24. The program storage device of claim 19, wherein the instructions to repair comprise instructions to replace a portion of the data obtained from the memory module with a corresponding portion of the second data obtained from the nonvolatile storage element.

25. The program storage device of claim 19, wherein the instructions to repair comprise instructions to replace all of the data obtained from the memory module with the second data obtained from the nonvolatile storage element.

26. A computer system, comprising:

a random access memory having one or more memory modules, each memory module having data indicating configuration information specific to said each memory module;

a nonvolatile storage element having stored therein the data for each of the one or more memory modules; and a processor module operatively coupled to the random access memory and nonvolatile storage element, the processor module adapted to determine if the data from one of the one or more memory modules is incorrect and, if it is, use at least a portion of the data from the nonvolatile storage element to replace at least a portion of the data of the memory module having the incorrect data.

27. The computer system of claim 26, wherein the random access memory comprises serial presence detect random access memory.

28. The computer system of claim 26, wherein the nonvolatile storage element comprises electrically erasable programmable read only memory.

29. The computer system of claim 26, wherein the nonvolatile storage element comprises a FLASH memory device.

30. The computer system of claim 26, wherein the nonvolatile memory element further comprises basic input-output system routine instructions.

31. The computer system of claim 26, wherein the processor module comprises a central processing unit.

32. The computer system of claim 31, wherein the processor module further comprises the nonvolatile storage element.

33. The computer system of claim 26, wherein the, nonvolatile memory element further comprises basic input-output system routine instructions.

34. A method to protect computer system memory configuration data, comprising:

obtaining configuration data from a computer system memory module;

determining if the obtained configuration data is incorrect, including determining if the configuration data obtained from the memory module represents a new memory module; and if it does, storing the configuration data obtained from the memory module in a nonvolatile storage element; and repairing the configuration data of the memory module if the obtained configuration data is incorrect.

35. The method of claim 34, further comprising configuring a memory control interface in accordance with the repaired memory configuration data.

36. The method of claim 34, wherein the act of obtaining configuration data comprises obtaining the configuration data from a serial presence detect random access memory module.

37. The method of claim 34, wherein the act of determining if the obtained configuration data is incorrect comprises evaluating a checksum value obtained as part of the obtained configuration data.

38. The method of claim 34, wherein the act of obtaining configuration data further comprises obtaining a second configuration data for the memory module from a nonvolatile storage element.

39. A program storage device, readable by a computer processor, comprising:

instructions stored on the program storage device for causing the computer processor to obtain configuration data from a computer system memory module;

determine if the obtained configuration data is incorrect, including causing the processor to determine if the configuration data obtained from the memory module represents a new memory; and if it does, store the configuration data obtained from the memory module in a nonvolatile storage element; and repair the configuration data of the memory module if the obtained configuration data is incorrect.

40. The program storage device of claim 39, further comprising instructions to configure a memory control interface in accordance with the repaired memory configuration data.

41. The program storage device of claim 39, wherein the instructions to obtain configuration data comprise instructions to obtain the configuration data from a serial presence detect random access memory module.

42. The program storage device of claim 39, wherein the instructions to determine if the obtained configuration data is incorrect comprise instructions to evaluate a checksum value obtained as part of the obtained configuration data.

43. The program storage device of claim 39, wherein the instructions to obtain configuration data further comprise instructions to obtain a second configuration data for the memory module from a nonvolatile storage element.

44. The program storage device of claim 43, wherein the instructions to determine if the obtained configuration data is incorrect comprise instructions to compare a portion of the configuration data with a portion of the second configuration data.

45. The program storage device of claim 43, wherein the instructions to repair comprise instructions to replace a portion of the configuration data obtained from the memory module with a corresponding portion of the second configuration data obtained from the nonvolatile storage element.

46. The program storage device of claim 43, wherein the instructions to repair comprise instructions to replace all of the configuration data obtained from the memory module with the second configuration data obtained from the nonvolatile storage element.

47. A computer system, comprising:
a random access memory having one or more memory modules, each memory module having module configuration data;
a nonvolatile storage element having stored therein configuration data for each of the one or more memory modules; and
a processor module operatively coupled to the random access memory and nonvolatile storage element, the processor module adapted to determine if the configuration data from one of the more memory modules is incorrect and, if it is, repair the configuration data of the memory module, and wherein the determination step further including determining if the configuration data obtained from the memory module represents a new memory module; and if it does, storing configuration data obtained from the memory module in a nonvolatile storage element.

48. The computer system of claim 47, wherein the random access memory comprises serial presence detect random access memory.

49. The computer system of claim 47, wherein the nonvolatile storage element comprises electrically erasable programmable read only memory.

50. The computer system of claim 47, wherein the nonvolatile storage element comprises a FLASH memory device.

* * * * *